United States Patent
Liu et al.

(10) Patent No.: US 9,294,973 B2
(45) Date of Patent: Mar. 22, 2016

(54) PEER-BASED HANDOFF PERFORMANCE MEASUREMENT

(71) Applicant: T-Mobile USA, Inc., Bellevue, WA (US)

(72) Inventors: Chunming Liu, Bellevue, WA (US); Bryan Fleming, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 77 days.

(21) Appl. No.: 14/293,867

(22) Filed: Jun. 2, 2014

(65) Prior Publication Data

US 2015/0289176 A1 Oct. 8, 2015

Related U.S. Application Data

(60) Provisional application No. 61/975,416, filed on Apr. 4, 2014.

(51) Int. Cl.
*H04W 36/00* (2009.01)
*H04W 8/12* (2009.01)

(52) U.S. Cl.
CPC ............ *H04W 36/0083* (2013.01); *H04W 8/12* (2013.01)

(58) Field of Classification Search
None
See application file for complete search history.

(56) References Cited

U.S. PATENT DOCUMENTS

| | | | |
|---|---|---|---|
| 2004/0228284 A1 | 11/2004 | Tuinstra | |
| 2005/0018611 A1 | 1/2005 | Chan et al. | |
| 2008/0130574 A1* | 6/2008 | Nam | H04L 47/10 370/331 |
| 2010/0153055 A1 | 6/2010 | Mucha et al. | |
| 2013/0094356 A1 | 4/2013 | Keith et al. | |
| 2013/0170471 A1* | 7/2013 | Nix | H04W 36/00 370/331 |
| 2013/0229939 A1* | 9/2013 | Teyeb | H04W 36/30 370/252 |
| 2014/0045500 A1* | 2/2014 | Dimou | H04W 36/0083 455/436 |
| 2015/0289176 A1* | 10/2015 | Liu | H04W 36/0083 370/331 |

OTHER PUBLICATIONS

"Ethernet Mobile Backhaul Solutions A Guid for Ethernet Mobile Backhaul Testing and Service Assurance", retrieved from <<http://web.archive.org/web/20120515000000*/http://www.jdsu.com/ProductLiterature/embs_sg_sas_tm_ae. pdf>>, JDSU, May 15, 2012, 8 pages.
PCT Search Report and Written Opinion mailed Jun. 29, 2015 for PCT Application No. PCT/US15/22482, 13 Pages.

* cited by examiner

*Primary Examiner* — Benjamin H Elliott, IV
(74) *Attorney, Agent, or Firm* — Lee & Hayes, PLLC

(57) ABSTRACT

Disclosed herein are techniques for measuring inter-domain handoff performance between network devices in different network domains. A peer-based handoff performance measurement process may include generating test data to be transmitted from a first edge device of a first network domain over an interface to a second edge device of a second network domain, the test data having an identifier (ID) to indicate that the test data is to be used for measuring handoff performance over the interface. The first edge device may add a start time to the test data indicating a start of a measurement instance using the test data, transmit the test data to the second edge device over the interface, receive the test data with a receive time added by the second edge device, and store at least the start time and the receive time as handoff performance data.

20 Claims, 8 Drawing Sheets

PEER-BASED HANDOFF PERFORMANCE MEASUREMENT

RELATED APPLICATIONS

This U.S. patent application claims priority to provisional U.S. patent application No. 61/975,416, entitled "Carrier Ethernet Reporting Framework," and filed on Apr. 4, 2014, the entirety of which is incorporated herein by reference.

BACKGROUND

Mobile backhaul networks connect cell sites to a mobile switching office (MSO) so that network traffic (e.g., voice, data, video, etc.) may be routed to appropriate destinations. In this manner, wireless carriers utilize mobile backhaul networks to transport or "haul" network traffic between the cell sites and the MSO so that the traffic may be delivered to a larger network (e.g., the Internet).

Ethernet-based mobile backhaul networks are commonly used to provide suitable bandwidth for transporting network traffic between the cell sites and the MSO. In this scenario, a service provider may provide Ethernet services to a customer (typically a wireless carrier) so that the customer may use the service provider's network (e.g., optical fiber) for mobile backhaul purposes. Such services are commonly referred to as "carrier" Ethernet services. In this scenario, a mobile backhaul network may include one or more service provider network domains having equipment (e.g., fiber and switching equipment) to provide carrier Ethernet services between a cell site(s) and an MSO. An Ethernet virtual circuit (EVC) (sometimes referred to as an "Ethernet virtual connection") may then be established in the mobile backhaul network to connect customer endpoint devices at the cell site and the MSO, as well as the aforementioned network domains therebetween, for providing packet-mode communication services.

As wireless technologies continue to evolve, the mobile backhaul networks must continually adapt to meet the needs of high throughput and high capacity wireless technologies, such as evolved high speed packet access (HSPA+), long term evolution (LTE), or any future Internet protocol (IP)-based network technology so that the mobile backhaul networks do not become a bottleneck for network traffic. In order to insure that mobile backhaul networks meet requisite performance requirements, carrier Ethernet service providers allocate a certain amount of network bandwidth to an EVC in the mobile backhaul network based on a Service Level Agreement (SLA) between the service provider(s) and the customer.

In order to enforce the SLA, standards bodies, such as the Metro Ethernet Forum (MEF) provide Operations, Administration and Maintenance (OAM) capabilities allowing, among other things, performance measurement implementations for identifying where performance degradation, impairments, and/or faults, if any, are occurring within the mobile backhaul network. For example, Technical Specification MEF 35 "Service OAM Performance Monitoring Implementation Agreement," published in April of 2012, specifies that both the service provider and the customer are required to take EVC performance measurements at EVC Maintenance Entity Points (MEPs) within their own network domains. In this scenario, each individual entity (i.e., customer and service provider) is responsible for measuring performance in the portion of the EVC within its own network domain. However, such an individualized measurement scheme creates challenges for performance monitoring of the network traffic flow that occurs between network domains ("inter-domain" network traffic flow).

Currently, there is no measurement scheme for monitoring the handoff performance of network traffic that is transmitted between network domains. As a result, it is difficult to enforce an SLA for a mobile backhaul network when performance falls below requirements specified in the SLA. This is due primarily to the fact that two different entities operating in different network domains of a mobile backhaul network may disagree on performance measurements made within their respective domains, and each entity may claim that their performance data is correct. With no scheme for monitoring handoff performance at the interface between network domains, it becomes difficult to resolve such a dispute.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for measuring inter-domain handoff performance between network devices in different network domains. Specifically, a peer-based handoff performance measurement scheme is disclosed that allows two edge devices in different network domains to establish a "handshake" and communicate directly with each other using existing network protocol so that the edge devices may cooperate in measuring handoff performance of network traffic between the edge devices. Although the techniques and systems disclosed herein are predominantly described with respect to implementation in a mobile backhaul network, this disclosure is not limited to mobile backhaul network implementations. That is, the peer-based handoff measurement scheme disclosed herein may be implemented across any suitable cross-domain network interface, such as an interface between the Internet and a telecommunications network, an interface between a cloud network and a telecommunications network, and so on.

In some embodiments, a peer-based handoff performance measurement process includes generating test data (e.g., a test frame) to be transmitted from a first edge device of a first network domain over an interface to a second edge device of a second network domain, the test data having an identifier (ID) to indicate that the test data is to be used for measuring handoff performance over the interface. The process may further include adding a start time to the test data indicating a start of a measurement instance using the test data, transmitting the test data to the second edge device over the interface, receiving the test data from the second edge device, the test data having a receive time that was added to the test data indicating a time at which the test data was received by the second edge device, and storing at least the start time and the receive time as handoff performance data.

In some embodiments, an existing network protocol is leveraged to implement the peer-based handoff measurement scheme disclosed herein. Particularly, information (e.g., identifiers and timing information) may be added to test data using the same network protocol as normal network traffic. In this manner, existing network architectures are minimally impacted, and normal network traffic is permitted to flow, largely uninterrupted, within the network architecture while the peer-based handoff measurement process is conducted, making the handoff measurement process more or less "transparent."

Example Environment

Figure 1:
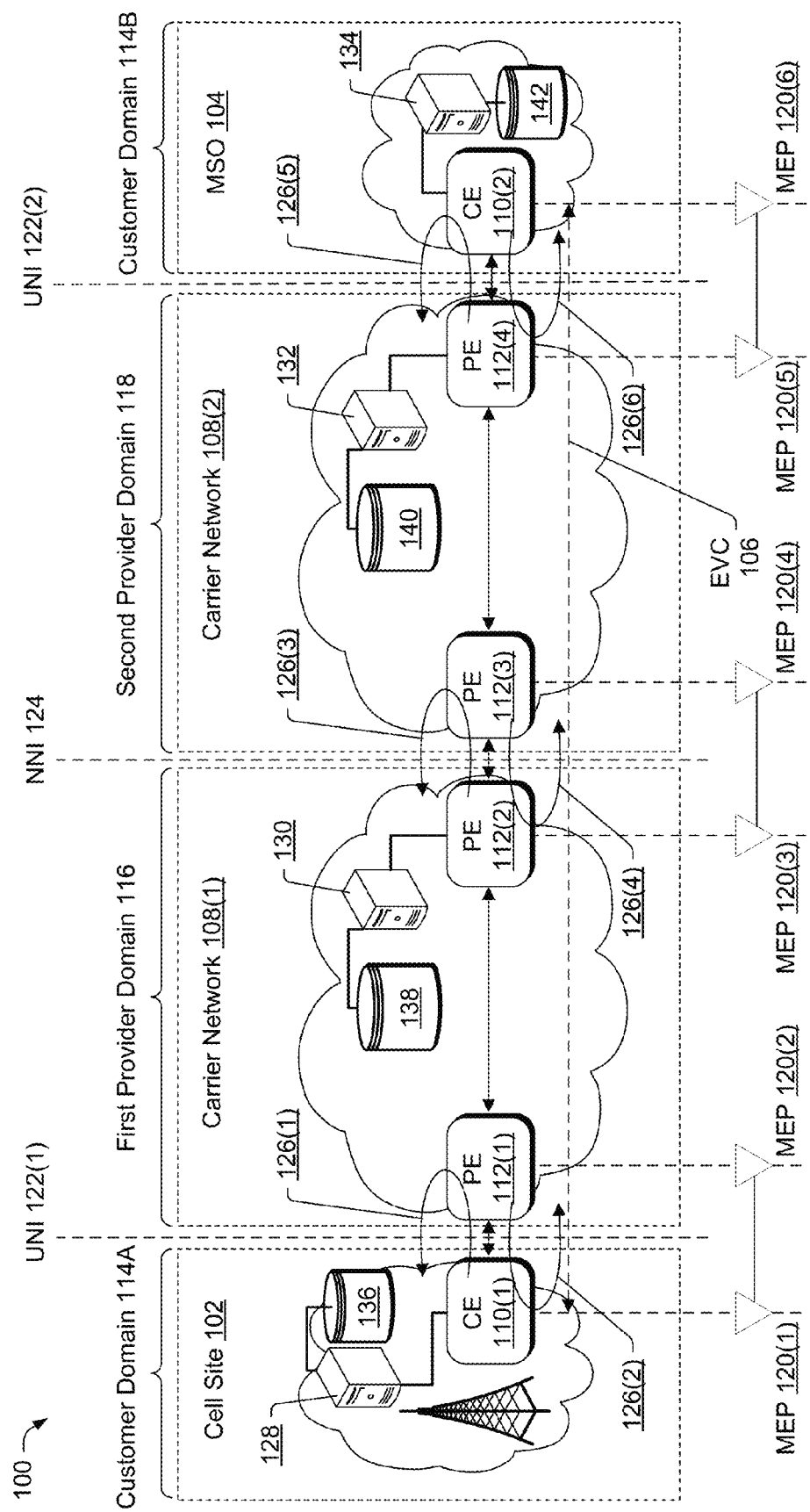
FIG. 1 illustrates an example mobile backhaul network wherein peer-based handoff performance measurement may be implemented.

FIG. 1 illustrates an example mobile backhaul network 100 wherein peer-based handoff performance measurement may be implemented. As shown in FIG. 1, a cell site 102 may be connected to a mobile switching office (MSO) 104 via an Ethernet Virtual Circuit (EVC) 106 established from the MSO 104, through one or more middle carrier Ethernet networks (e.g., a carrier network 108(1), a carrier network 108(2), etc.), to the destination cell site 102. The EVC 106 allows for packet-mode communication services between customer endpoints at the cell site 102 and the MSO 104. Although FIG. 1 shows two carrier networks 108(1) and 108(2) for illustrative purposes, it is to be appreciated that as few as one carrier network 108, or any number of two or more carrier networks 108 may be utilized for carrier services between the cell site 102 and the MSO 104. Each carrier network 108 may be maintained and operated by a service provider of Ethernet services to a customer that owns and/or maintains the cell site 102 and the MSO 104. In this manner, the customer (e.g., a wireless carrier) may pay for the use of (e.g., subscribe to) the carrier networks 108(1) and 108(2) for mobile backhaul purposes. As such, the service providers that own and maintain the carrier networks 108(1) and 108(2) may also be referred to as "carrier" Ethernet service providers herein. Furthermore, in some instances the carrier networks 108(1) and 108(2) may be owned and/or maintained by the same service provider or different service providers.

The mobile backhaul network 100 may support any type of wireless communication network including 1G networks, 2G networks, 3G networks, 4G networks, later generation networks, Wi-Fi networks, or Wi-Max networks, or any combination of these networks, among others. The mobile backhaul network 100 may further employ any suitable transport technology (transport protocol) to transport network traffic therein. Examples of suitable transport protocols include, without limitation, synchronous digital hierarchy ("SDH"), synchronous optical networks ("SONET"), multiprotocol label switching ("MPLS"), carrier-Ethernet transport ("CET"), or any other suitable transport protocol. In general, networking equipment within the mobile backhaul network 100 provide a wide area infrastructure over which carrier Ethernet services may be provided to customers who subscribe to the Ethernet services. Moreover, any suitable transport medium (e.g., optical fiber) may be utilized within the mobile backhaul network 100 to interconnect the networking devices therein. The mobile backhaul network 100 may be wired or wireless, or a combination of wired and wireless components. For example, microwave and mesh or edge network topologies may be used in wireless implementations of the mobile backhaul network 100.

In some embodiments, the EVC 106 may be a point-to-point EVC connecting two endpoint customer edge (CE) devices 110(1) and 110(2), as shown in FIG. 1. However, it is to be appreciated that the EVC 106 may be implemented as a multipoint EVC connecting sets of multiple endpoint CE devices. Although a single EVC 106 is shown in FIG. 1, it should also be appreciated that more than one EVC 106 may be implemented within the mobile backhaul network 100. This may be the case when using an operator virtual connection (OVC) to tunnel multiple EVCs (i.e., virtual local area network (VLAN) paths). An OAM domain model is defined in Technical Specification MEF Section 30.1 "Service OAM Fault Management Implementation Agreement Phase 2," published in April of 2013, that supports carrier Ethernet services including EVC and OVC-based services, and is incorporated herein by reference. The EVC-based services may include E-Line, E-LAN, and E-Tree as defined in Technical Specification MEF 6.1 "Metro Ethernet Services Definitions Phase 2," published in April of 2008, and the OVC-based services may include E-Access service as defined in Technical Specification MEF 33 "Ethernet Access Services Definition," published in January 2012; both are incorporated herein by reference.

In between the CE devices 110(1) and 110(2), the EVC 106 may be established through, and interconnect, multiple provider edge (PE) devices 112(1), 112(2), 112(3), and 112(4). The CE devices 110(1) and 110(2) are within a first and second portion of a customer network domain, namely customer network domain portion 114A and customer network domain portion 114B, the PE devices 112(1) and 112(2) are within a first provider network domain 116, and the PE devices 112(3) and 112(4) are within a second provider network domain 118. The CE devices 110 and the PE devices 112 may be any suitable networking elements including, without limitation, switching devices (e.g., Ethernet switches), routers, and so on. Communication between these edge devices may be wired, wireless, or both.

In general, the service providers of the carrier networks 108(1) and 108(2) allocate a certain amount of network bandwidth to the EVC 106 according to a guaranteed communication rate (sometimes called the "Committed Information Rate (CIR) bandwidth") specified in a Service Level Agreement (SLA) between the service provider(s) and the customer. Accordingly, the CIR bandwidth is to be provided along the end-to-end EVC 106, and if the terms of the SLA are not met due to faults in the system that cause transmission rates to be below the CIR, the SLA may be enforced to correct or repair the system to provide the CIR.

In some embodiments, the mobile backhaul network 100 is configured to utilize Operations and Maintenance (OAM) mechanisms to, among other things, allow the service providers and the customer to conduct performance measurements to identify performance degradation, impairments, and/or faults, if any, occurring along the EVC 106. In this scenario, individual ones of the edge devices (i.e., the CE devices 110 and the PE devices 112) may be designated as Maintenance Entity Points (MEPs) 120. FIG. 1 illustrates an example where CE device 110(1) is designated as MEP 120 (1), PE device 112(1) is designated as MEP 120(2), PE device 112(2) is designated as MEP 120(3), PE device 112(3) is designated as MEP 120(4), PE device 112(4) is designated as MEP 120(5), and CE device 110(2) is designated as MEP 120(6). An MEP 120 is used generally herein to refer to an edge device (among the CE devices 110 and the PE devices 112) at which network traffic is initiated and/or terminated for purposes of taking EVC performance measurements.

Using individual ones of the MEPs 120(1)-(6), the service providers and the customer may take EVC performance measurements at various points along the EVC 106. For example, the customer may measure end-to-end EVC performance between MEP 120(1) and MEP 120(6) that are within the customer network domain 114A/B, while the service provider associated with carrier network 108(1) may measure EVC performance of the EVC 106 between MEP 120(2) and MEP 120(3), and the service provider associated with carrier network 108(2) similarly may measure EVC performance between MEP 120(4) and MEP 120(5). As such, each independent entity may measure EVC performance within its respective network domain (among the network domains 114A, 114B, 116, and 118). As mentioned above, however, there are current challenges for performance monitoring of the network traffic flow that occurs between network domains ("inter-domain" network traffic flow) where different entities may own and maintain the respective edge devices in each of the network domains.

Network traffic traverses the EVC 106 from the CE device 110(1) to the PE device 112(1) over a user-to-network interface (UNI) 122(1). Similarly, network traffic may also be transferred between the PE device 112(4) and the CE device 110(2) over a UNI 122(2). Furthermore, when more than one carrier network 108 exists within the mobile backhaul network 100, as is the case in FIG. 1, network traffic may be transferred between the PE device 112(2) and the PE device 112(3) over a network-to-network interface (NNI) 124. The transfer of network traffic between two edge devices in different network domains is referred to herein as a "Handoff." Accordingly, there may be a "UNI handoff" that occurs at either or both of the UNIs 122(1) and 122(2), and there may be a "NNI handoff" that occurs at the NNI 124.

Like the network traffic that flows along the EVC 106 between the interfaces (UNIs 122 and NNI 124) in FIG. 1, the handoff of network traffic between network domains is to be provisioned with the CIR bandwidth specified in the SLA between the service provider(s) and the customer. If the CIR bandwidth is not met, the SLA may be enforced to correct or repair the cause of the degraded performance.

According to embodiments disclosed herein, the handoff performance (i.e., EVC performance) of any handoff of network traffic between two network domains may be measured by communicating test data under a peer-based test protocol between edge devices in the respective network domains where the handoff performance is to be measured. FIG. 1 illustrates example paths 126(1)-(6) that the test data may follow for handoff performance measurement purposes, according to the embodiments disclosed herein. By sending test data along individual ones of the paths 126(1)-(6), timing information (i.e., departure and/or arrival times) may be registered for the test data at each edge device and stored as handoff performance data that may be used to calculate various handoff performance metrics. In this sense, the peer-based handoff performance measurement scheme that takes place between any two edge devices in different network domains is more or less "autonomous", meaning that the edge devices are able to communicate using a common test protocol for handoff performance measurement, and are able to report handoff performance data and metrics to other devices, including each other. The ability to send test data in either direction across the UNI/NNI allows any edge device to determine handoff performance metrics in either direction, and in terms of one-way travel and round trip travel of the test data. The various techniques and processes to measure handoff performance with test data will be described in more detail with reference to the following figures.

In some embodiments, EVC performance measurements may be initiated and run by one or more performance servers 128, 130, 132, and 134 in each network domain. In this manner, EVC performance data, including performance data relating to the handoff between network domains ("handoff performance data") may be collected and stored in respective data stores of each network domain, such as the data stores 136, 138, 140, and 142. While the performance servers 128-134 are each shown as a single computing device, each of the performance servers 128-134 may be implemented in any one or more computing devices, such as PCs, workstations, server systems, mainframes, server farms, or any other computing devices. An example of the performance servers 128-134 is illustrated in greater detail in FIG. 8 and is described in detail below with reference to that figure.

Figure 2:
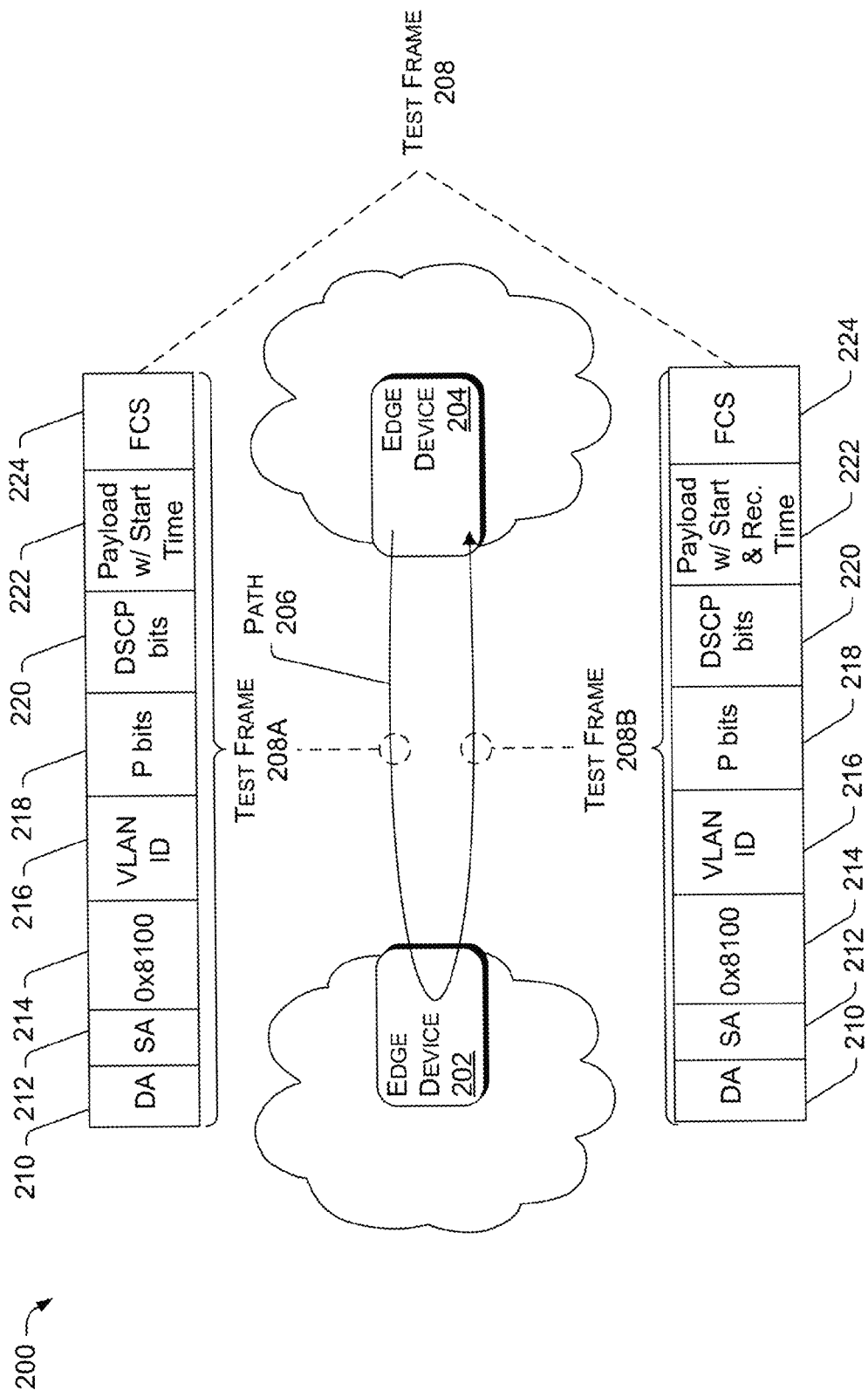
FIG. 2 illustrates a diagram of an example peer-based handoff measurement scheme between two edge devices in different network domains.

FIG. 2 illustrates a diagram 200 of an example peer-based handoff measurement scheme between two edge devices in different network domains. FIG. 2 shows edge device 202 of a first network domain in communication with edge device 204 of a second network domain. For example, the edge device 202 may represent a CE device, such as the CE device 110(1) of FIG. 1, and the edge device 204 may represent a PE device, such as the PE device 112(1) of FIG. 1. In the aforementioned example, the interface between the edge devices 202 and 204 is a UNI, such as the UNI 122(1) of FIG. 1. Alternatively, the edge device 202 may represent a PE device, such as the PE device 112(2) of FIG. 1, and the edge device 204 may represent a PE device such as the PE device 112(3) of FIG. 1. In this latter example, the interface between the edge devices 202 and 204 is a NNI, such as the NNI 124 of FIG. 1. In general, the edge devices 202 and 204 may represent networking devices in respective network domains within any network topology. For purposes of illustration, the edge devices 202 and 204 represent edge devices of a mobile backhaul network, such as the mobile backhaul network 100 of FIG. 1.

FIG. 2 further illustrates an example peer-based handoff measurement scheme for measuring inter-domain handoff performance of network traffic transferred between the edge devices 202 and 204 in their respective network domains. In this embodiment, test data may transmitted along a path 206 so that inter-domain handoff performance may be measured using the test data. FIG. 2 illustrates that the test data initially departs from the edge device 204 and travels along the path 206 until it is received at the edge device 202, and the test data is then returned to the edge device 204. In this example, the test data is in the form of a test frame 208 (a unit of transmission in a link layer protocol, such as Layer 2 of the Open Systems Interconnection (OSI) model for Ethernet layer service connections) that is transportable within a packet-switched network (e.g., IP-based network). FIG. 2 shows the test frame 208A on a first leg of the path 206, traveling to the edge device 202 from the edge device 204 over the interface (i.e., UNI or NNI). The test frame 208A is then returned as test frame 208B at a subsequent point in time as it travels back across the interface from the edge device 202 to the edge device 204 along a second leg of the path 206.

The test frames 208A and 208B generally include multiple fields that contain information. The fields may include, without limitation, a destination address (DA) field 210 containing a destination media access control (MAC) address, a source address (SA) field 212 containing a source MAC address, a type identifier (ID) field 214 for virtual local area network (VLAN) tagged packets (having a value of 0x8100), a VLAN ID field 216 for specifying a value that dictates the EVC "pipe" (e.g., the EVC 106) along which the test frame 208 is to be transported, a "P-bits" field 218 to specify a class of service (CoS) level (described in more detail below), a differentiated services code point (DSCP) field 220 to specify an ID for the test frame 208 that indicates that the test frame 208 is for measuring handoff performance over the interface between the edge devices 202 and 204, a payload data field 222 for registering or recording timing information when the test frame 208 arrives at, and departs from, each of the edge devices 202 and 204, and a frame check sequence (FCS) field 224 used for error detection. It is to be appreciated that the test frame 208 may include more or fewer fields than those shown in FIG. 2.

Notably, the test frame 208 may be of the same or similar format to a frame of normal network traffic (i.e., voice, data, or video frames), but it is differentiated by marking the test frame 208 in the IP layer via the DSCP field 220 where a particular DSCP bit value(s) identifies the test frame 208 as being a test frame 208 used for measuring handoff performance over the interface between the edge devices 202 and 204. Accordingly, upon receiving the test frame 208A at the edge device 202, the edge device 202 may read/check the test frame ID in the DSCP field 220, and if it matches a peer-based handoff measurement value according to a peer-monitoring communication test protocol, the edge device 202 recognizes the test frame 208A as having a purpose of measuring handoff performance at the interface between the two edge devices 202 and 204. This event may be considered as causing a "handshake" to be established between the two edge devices 202 and 204 such that they may "talk" directly with one another by passing the test frame 208 back and forth for handoff performance measurement purposes. Moreover, the peer-based handoff performance measurement scheme describe herein may advantageously be implemented with minimal impact on existing networking architectures since an existing protocol can be followed, yet the test frame 208 may still be differentiated by a value change to a data field used in normal network traffic frames.

In some embodiments, the test frame 208 may be generated at the edge device 204 upon a trigger event that initiates a measurement instance for handoff performance. A measurement period including multiple measurement instances may occur periodically (e.g., every fifteen minutes for more or less real-time handoff performance monitoring), at the direction of a user/operator, or upon detecting performance degradation, impairment, or a fault (e.g., falling below CIR bandwidth), and so on. Upon generation of the test frame 208 at the edge device 204 for a measurement instance, the edge device 204 may add a start time to the payload data field 222 representing a departure time of the test frame 208A from the edge device 204. The payload data field 222 may accordingly act as a placeholder for registering/adding timing information during the handoff performance measurement process.

Upon receipt of the test frame 208A at the edge device 202, and upon recognizing the test frame 208A as having the purpose of measuring handoff performance, a handshake is established and the edge device 202 adds a receive time to the payload data field 222 and returns test frame 208B to the edge device 204 over the interface. In some embodiments, the test frame 208A may be recognized by a particular DSCP bit value in the DSCP field 220. Upon receiving the test frame 208B at the edge device 204, the edge device 204 may add a final receive time to the payload data field 222; useful for round-trip handoff performance measurement. This process may be iterated any suitable number of times for multiple measurement instances (e.g., 500 test frames 208 may be delivered sequentially along the path 206 with timing information recorded in the payload data field 222 for each test frame 208). In this manner, the recorded timing information associated with the test frames 208 of a measurement instance may be stored as handoff performance data in a respective data store, such as the data stores 136-142 of FIG. 1. Each test frame 208 may further utilize a packet ID to specify the test frame number in the sequence of delivered test frames 208. Using this handoff performance data, various handoff performance metrics may be calculated or otherwise derived, including, without limitation, frame delay, inter-frame delay variation or jitter, frame loss ratio, availability, and so on.

As an illustrative example, equations (1), (2), and (3) may be used for frame delay calculation using a single test frame 208:

$$\text{Delay}(A \to B) = \text{Start Time}_A - \text{Rec.Time}_B \quad \text{Equ. (1)}$$

$$\text{Delay}(B \to A) = \text{Rec.Time}_B - \text{Final Rec.Time}_A \quad \text{Equ. (2)}$$

$$\text{Delay}(A \to B \to A) = \text{Start Time}_A - \text{Final Rec.Time}_A \quad \text{Equ. (3)}$$

In equations (1)-(3), as well as the following equations, point "A" may represent an initiating edge device, such as the edge device 204 that generates and sends a test frame 208, and point "B" may represent a receiving edge device, such as the edge device 202 that receives the test frame 208 from the edge device 204 over an interface (i.e., UNI/NNI). Accordingly, "Start Time$_A$" represents the start time that is added to the test data at point "A," "Rec. Time$_B$" represents the receive time added to the test data at point "B," and so on. As illustrated by the equations (1)-(3), both one-way and two-way handoff performance metrics may be calculated; in this case, one-way frame delay (i.e., equations (1) and (2)) and two-way frame delay (i.e., equation (3)).

In some embodiments, inter-frame delay variation or jitter may be calculated by using equations (4), (5), and (6) for two consecutive test frames 208 as follows:

$$\text{Jitter}(A \to B) = \text{Delay}_{(A \to B)} \text{ of } 1^{st} \text{ Frame}_A - \text{Delay}_{(A \to B)} \text{ of } 2^{nd} \text{ frame}_A \quad \text{Equ. (4)}$$

$$\text{Jitter}(B \to A) = \text{Delay}_{(B \to A)} \text{ of } 1^{st} \text{ Frame}_B - \text{Delay}_{(B \to A)} \text{ of } 2^{nd} \text{ frame}_B \quad \text{Equ. (5)}$$

$$\text{Jitter}(A \to B \to A) = \text{Delay}_{(A \to B \to A)} \text{ of } 1^{st} \text{ Frame} - \text{Delay}_{(A \to B \to A)} \text{ of } 2^{nd} \text{ frame} \quad \text{Equ. (6)}$$

In some instances, test frames 208 that were sent by the initiating edge device 204 may not be received by the edge device 204. The edge device 204 may use a predetermined time interval (e.g., five minutes) to wait for a sent test frame 208 to return, and if the edge device 204 does not receive the sent test frame 208 by the expiration of the predetermined time interval, it may consider the test frame 208 to be a "lost" frame. When this occurs, it is called a frame loss. Accordingly, a frame loss ratio may be calculated by using equation (7) for any number of sequentially delivered test frames 208 over a selected time interval as follows:

$$\text{Frame Loss Ratio} = \frac{\text{Total Received Frames}}{\text{Total Sent Frames}} \quad \text{Equ. (7)}$$

Availability may be measured by the time that a MEP is in available state. An unavailable state is encountered when at least one of the frame loss, frame delay, and inter-frame delay variation metrics exceed some predetermined bound/threshold during a time interval. These bounds/thresholds may be determined by the CoS.

Although certain handoff performance metrics are described herein, it is to be appreciated that any suitable handoff performance metrics may be calculated from the handoff performance data that is collected using the peer-based handoff performance measurement scheme disclosed herein, and the metrics may be based on the definition key performance indicators (KPIs) as defined by the MEF in its "Carrier Performance Reporting Framework."

Figure 3:
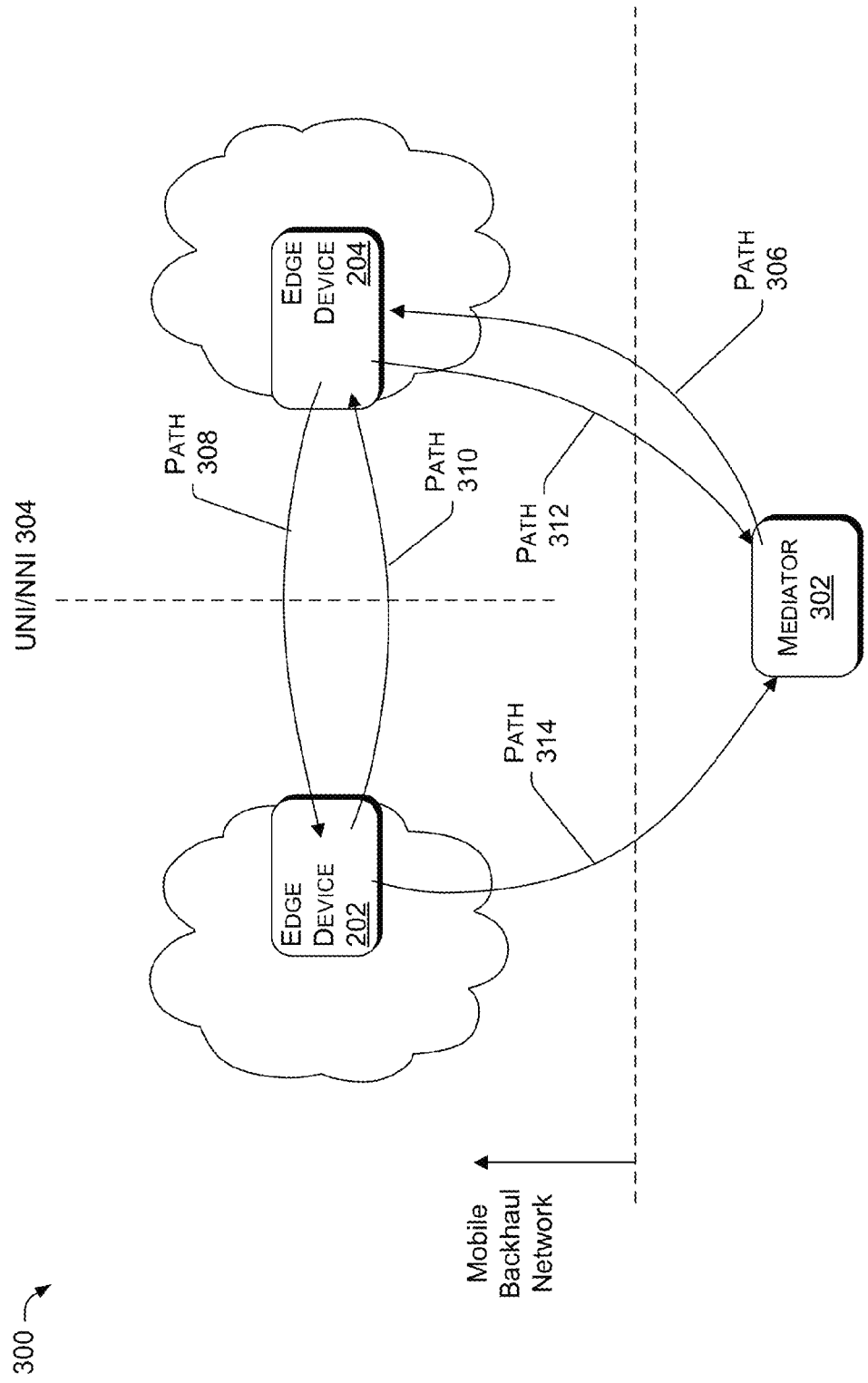
FIG. 3 illustrates a diagram of an example peer-based handoff measurement scheme according to another embodiment utilizing a neutral mediator for monitoring handoff performance.

Turning now to FIG. 3, illustrated therein is a diagram 300 of an example peer-based handoff measurement scheme according to another embodiment utilizing a neutral mediator 302 for managing handoff performance measurement. FIG. 3 illustrates two edge devices, which may be the same edge devices 202 and 204 as shown in FIG. 2, or different edge devices, that are configured to establish a handshake with each other to perform a peer-based handoff measurement process over a UNI/NNI 304, signifying that the edge devices 202 and 204 are within different network domains.

In the embodiment of FIG. 3, the neutral mediator 302 may be invited by the service provider and the customer of a mobile backhaul network (e.g., the mobile backhaul network 100 of FIG. 1) to initiate and manage peer-based handoff performance measurement from a neutral perspective, such as when the entities associated with the different domains do not wish to share handoff performance data amongst themselves. The neutral mediator 302 may be utilized when handoff performance measurement is to be verified with perhaps higher security, trust, and integrity of the handoff performance data being collected, which may help resolve disputes between two independent entities to an SLA, for example. FIG. 3 shows that the neutral mediator 302 may be separate from the mobile backhaul network in the sense that the neutral mediator 302 serves the purpose of implementing the peer-based handoff performance measurement process and is not otherwise involved in normal backhaul of network traffic between a cell site (e.g., the cell site 102) and an MSO (e.g., the MSO 104).

The neutral mediator 302 may be configured to initiate a measurement instance and generate the test data (e.g., the test frame 208 of FIG. 2), or it may instruct one of the edge devices, such as the edge device 204, to generate the test data including the ID (e.g., DSCP bit value) for handshaking purposes with the other edge device 202 in another network domain. This initiation of a measurement instance is represented by the path 306, which may include instructions to initiate the measurement or the test data itself, identified as such via the test frame ID in, for example, the DSCP field 220 of the test frame 208. The edge device 204 may then add a start time to the test data (e.g., in the payload data field 222 of the test frame 208) and send the test data along path 308, over the UNI/NNI 304, to the edge device 202 in a different network domain.

The edge device 202 may be configured to recognize the test data by its ID (e.g., the DSCP bit value) in order to cause the edge device 202 to add a receive time to the test data and send the test data to a destination based on address information in the test data. For example, the DA field 210 of the test frame 208 may be utilized to instruct the edge device 202 to return the test data to the edge device 204 along return path 310, which may allow the edge device 204 to add a final receive time to the test data for round-trip handoff performance measurement and forward the test data to the neutral mediator 302 along path 312. Alternatively, the edge device 202 may, upon receipt of the test data, forward the test data to the neutral mediator 302 based on address information (e.g., IP address) along path 314 when one-way handoff is suitable for performance measurement purposes.

In some embodiments, the test data itself (e.g., a test frame 208) may be forwarded by either of the edge devices 202 or 204 to the mediator 302, while in other embodiments, the timing information added to the test data (e.g., the timing information added to the payload data field 222) may be extracted and included in a newly generated frame or packet and sent to the mediator 302. In yet other embodiments, either of the edge devices 202 or 204 may collect multiple test frames 208 received during measurement instances and may send the multiple test frames 208 in batches or groups to the mediator 302 periodically (e.g., at predetermined times, when network bandwidth becomes available to a predetermined threshold, upon receiving a threshold number of test frames, etc.). The mediator 302 may have its own intelligence to calculate handoff performance metrics based on separate reports of handoff performance data from each of the edge devices 202 and 204 respectively. For example, the mediator 302 may be configured to calculate frame delay, jitter, or any other suitable metrics from start times and receive times included in the test data reported from each edge device 202 and 204.

In some embodiments, encryption techniques may be utilized to address third party manipulation of data, such as public/private key encryption. In this manner, only the edge devices 202 and 204, and perhaps the mediator 302, possess the requisite keys to decrypt test data to read an ID (e.g., the DSCP bit value), add timing information (e.g., add timing information to the payload data field 222, and re-encrypt the test data before forwarding to a destination device.

Figure 4:
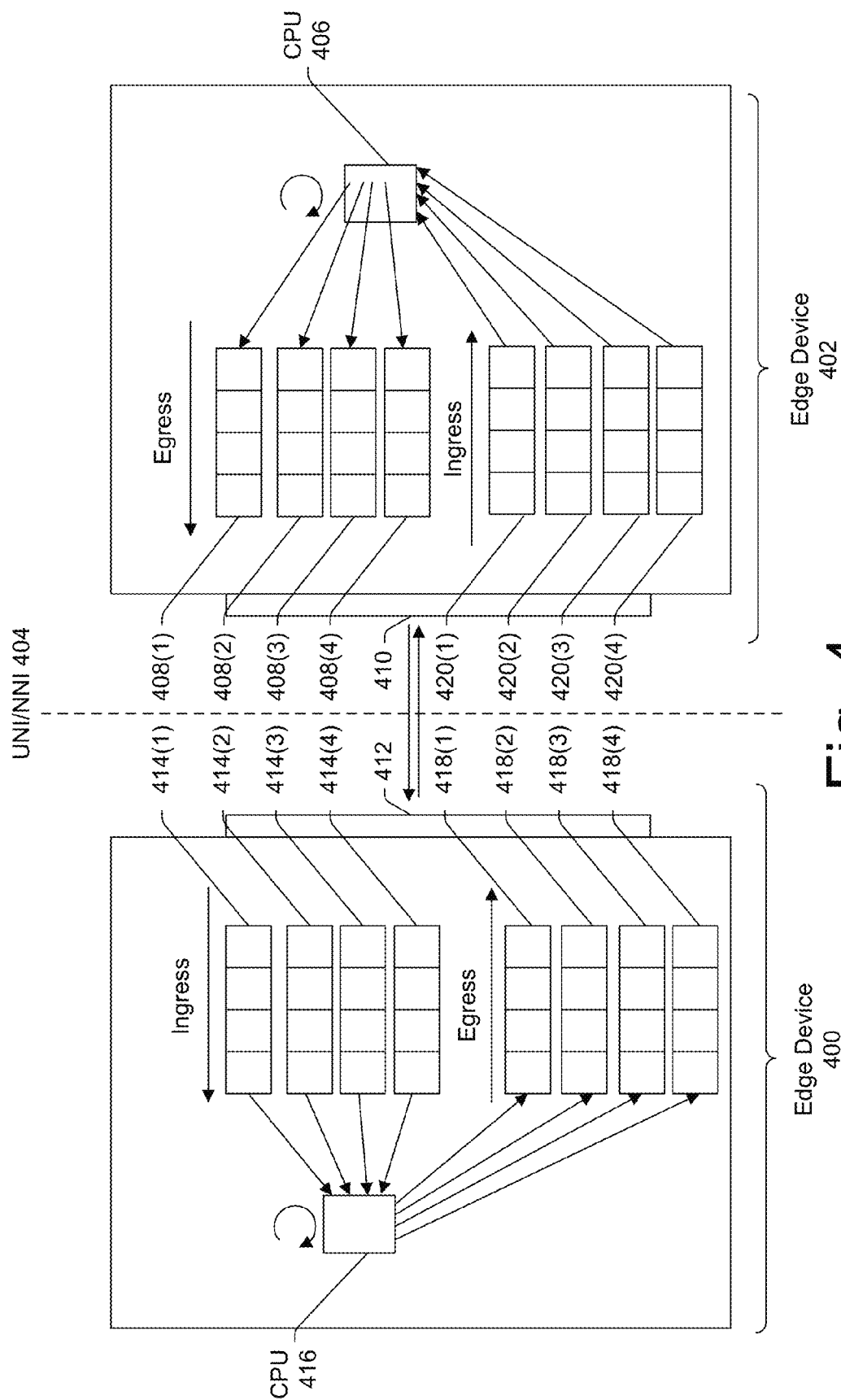
FIG. 4 illustrates an example peer-based handoff measurement scheme according to another embodiment where handoff performance may be measured across multiple Class of Service (CoS) levels.

FIG. 4 illustrates an example peer-based handoff measurement scheme according to another embodiment where handoff performance may be measured across multiple class of service (CoS) levels. The CoS may be specified within the test data (e.g., the test frame 208). As noted above, the P-bits field 218 may be utilized for this purpose. Different CoSs can be defined as a "low" class, a "medium" class, or a "high" class, or alternatively, numeric values (e.g., a numeric range of 1-8, with a value of "1" representing the highest class value. In some embodiments the P-bits field 218 may be specified as a 3 bit value, which allows for eight ($2^3$) CoS levels. In multiple CoS (multi-CoS) services, the CoS is a parameter that may be associated with different types of services dictating priority of network traffic delivery and importance of network traffic in terms of the acceptable levels of packet delay, packet loss, jitter, and the like.

For example, particular network traffic, such as critical synchronization information and/or packet data protocol (PDP) data, may be designated as a CoS level 1 (i.e., highest priority) such that it should be delivered with high integrity (i.e., little or no frame delay, frame loss, or jitter). This may include sending the CoS level 1 data on a dedicated route as opposed to a shared route, and/or with no packet delay, packet loss, jitter, etc.). Meanwhile, other network traffic may be designated as CoS level 2, such as voice data, where integrity is still important, but some underperformance may be accepted. Real-time streaming video or other real-time data may be in CoS level 3, and web browsing-related services and/or file transfers may be in a lower CoS level 4 where some level of packet loss and other delays may be accepted without impacting usage of the data significantly. In this manner, any network traffic that travels through a multi-CoS service network (e.g., the mobile backhaul network 100 with multi-CoS service) is to follow a CoS policy when processing network traffic. In this manner, if a burst of network traffic occurs where not all of the traffic can be handled by a limited bandwidth network, the networking device (e.g., the CE devices 110 and/or the PE devices 112) may throttle (via admission control or other policing mechanisms) the traffic by deciding a drop preference (i.e., which packets are lower priority on the CoS spectrum suitable for being dropped). CoS may be mapped to corresponding quality of service (QoS) levels according to QoS classification scheme which provides differentiated QoS levels by assigning each type of frame to a egress/ingress queue where each queue has a different probability to access the available bandwidth.

FIG. 4 illustrates edge device 400 that is connected to edge device 402 within a network, such as a mobile backhaul network over a UNI/NNI 404 such that the edge device 400 is considered to be in a different network domain than the edge device 402. For instance, the edge device 400 may represent the CE device 110(1) of FIG. 1, and the edge device 402 may represent the PE device 112(1) of FIG. 1, or the edge devices 400 and 402 may represent any other pair of edge devices separated at a boundary defined by the UNI/NNI 404. It is to be appreciated that the edge devices 400 and 402, as well as any of the edge devices discussed herein, may represent MEPs configured to initialize and/or terminate handoff performance measurement instances for storing and reporting handoff performance data.

Edge device 402 may initialize a measurement instance periodically (e.g., every 10 seconds) as part of a handoff performance measurement process that may iterate sequential measurement instances over a time interval to monitor handoff performance. The frequency and/or number of measurement instances in which a test frame is sent may be selected in order to minimize or eliminate the impact on normal network traffic. That is, the intervals at which measurement instances occur may be throttled to allow for less frequent and/or fewer numbers of test frames 208 to be sent, such as when a large amount of bandwidth is consumed by normal traffic. In one illustrative example, the frequency and/or number of test frames 208 may be throttled to account for about 2% of the total bandwidth of the connection when the connection is congested with normal traffic.

Furthermore, handoff performance measurement may occur periodically (e.g., every fifteen minutes) where multiple measurement instances (i.e., multiple test frames) are sequenced to collect handoff performance data that may then be analyzed and process in the calculation of handoff performance metrics. This may allow for more or less "real-time" handoff performance measurement and reporting.

As an illustrative example, the edge device 402 may initialize a measurement instance in a multi-CoS service environment where a central processing unit (CPU) 406 of the edge device 402 generates multiple (e.g., four) test frames 208, one for each class of a 4-level CoS spectrum. The CPU 406 may comprise one or more processors, and may be implemented in hardware and/or software, including an application specific integrated circuit (ASIC), system on chip (SoC), or a similar integrated circuit (IC).

As noted above, each of the generated test frames 208 may include an ID that indicates that the test frame 208 is for measuring handoff performance over the UNI/NNI 404. Each test frame 208 may also be marked with a different P-bits value in the P-bits field 218 to designate each test frame at the different CoS level. Additionally, a start time may be added to the payload data field 222, as described above, for each test frame 208.

In some embodiments, the edge device 402 may push/place each test frame 208 into one of the egress queues 408(1), 408(2), 408(3), or 408(4), which represent the hierarchy of CoS levels in the multi-CoS service. Although FIG. 4 shows four CoS levels, it is to be appreciated that any number of CoS levels may be specified by utilizing P-bit values of different numbers of bits. As such, the multiple test frames 208 generated may be processed by a virtual port scheduler that follows an egress policy as part of an input/output (I/O) bound process. The egress policy may be defined by the QoS scheme to which the CoS levels are mapped. A commonly used algorithm for QoS differentiation for the egress policy is Weighted Fair Queue, but any suitable queuing algorithms may be used for processing frames in the I/O bound process.

A test frame 208 that leaves any of the queues 408(1)-(4) according to the egress policy may be delivered through an egress port 410 and across the UNI/NNI 404 to the edge device 400, where the test frame 208 arrives at an ingress port 412 of the edge device 400. A virtual port scheduler of the edge device 400 follows an ingress policy as part of an I/O bound process to place the test frame 208 into one of the ingress queues 414(1), 414(2), 414(3), or 414(4). The ingress policy, like the egress policy, may be defined by the QoS scheme mapped to the CoS levels, and any suitable queuing algorithm may be utilized for this purpose. The edge device 400, in some embodiments, may be configured to read/check the P-bits value in the P-bits field 218 to determine the appropriate ingress queue 414(1)-(4) in which the test frame 208 is to be placed and process according to the ingress policy. A CPU 416 of the edge device 400 may receive the test frames 208 according to the ingress policy and may process each test frame 208 by reading/checking the ID of the test frame 208, such as the DSCP bit value in the DSCP field 220 to recognize the test frame 208 as a frame that is to be used for handoff performance measurement. Upon recognizing the ID of the test frame 208 for handoff performance measurement, the CPU 416 of the edge device 400 may add a receive time to the test frame 208 (e.g., by adding the receive time in the payload data field 222).

After adding a receive time to the test frame 208, the edge device 400 may cause the test frame 208 to be returned to the edge device 402 in a similar manner to how the test frame 208 was sent from the edge device 402 to the edge device 400. That is, the edge device 400 may push/place each test frame 208 it receives into one of the egress queues 418(1), 418(2), 418(3), or 418(4) according to the marked CoS level of each test frame 208 (e.g., P-bit values) so that the test frames 208 may be processed by a virtual port scheduler that follows an egress policy as part of an input/output (I/O) bound process at the edge device 400.

A test frame 208 that leaves any of the queues 418(1)-(4) according to the egress policy may be delivered through the port 412 and across the UNI/NNI 404 to the edge device 402, where the test frame 208 arrives at the port 410 of the edge device 402. A virtual port scheduler of the edge device 402 follows an ingress policy as part of an I/O bound process to place the test frame 208 into one of the ingress queues 420(1), 420(2), 420(3), or 420(4). For example, the edge device 402 may be configured to read/check the P-bits value in the P-bits field 218 to determine the appropriate ingress queue 420(1)-(4) in which the test frame 208 is to be placed and process according to the ingress policy. The CPU 406 of the edge device 402 may receive the test frames 208 according to the ingress policy and may process each test frame 208 by reading/checking the ID of the test frame 208, such as the DSCP bit value in the DSCP field 220 to recognize the test frame 208 as a frame that is to be used for handoff performance measurement. Upon recognizing the ID of the test frame 208 for handoff performance measurement, the CPU 406 of the edge device 402 may add a final receive time to the test frame 208 (e.g., by adding the receive time in the payload data field 222).

The timing information (i.e., the start time, the receive time, and the final receive time) collected during the peer-based handoff performance measurement process may be stored as handoff performance data and associated with the test frames 208 that were sent using the peer-based test protocol. As noted above, the collected handoff performance data may be analyzed or otherwise used to derive or calculate handoff performance metrics, such as one-way and/or two-way delay, jitter, frame loss ratio, availability, and so on. Furthermore, because the test frames 208 may be sent according to the multi-CoS implementation of FIG. 4 via different ingress/egress queues, the handoff performance metrics may be associated not only with the level of the EVC along which the test frames travel, but also with the CoS level that each test frame 208 is associated with. In this manner, handoff performance may be monitored for each CoS level, for a particular UNI/NNI at the port level, and on a per-frame basis.

In some embodiments, any suitable parameter(s) of the test frames 208 may be varied to enable handoff performance measurement that is differentiated and evaluated across various combinations of the varied parameters. The parameters of the test frames that may be varied include, without limitation, the CoS level of the test frame, the ingress/egress queue, the particular EVC in a multi-EVC scenario, the frame size, the port of the edge device through which the test frame is sent, or any other suitable variable parameter of the test frame 208. For example, test frames 208 of different sizes (e.g. payload sizes) may be utilized for handoff performance measurement so that handoff performance for respective frame sizes may be measured. In this manner, a frame size that leads to the best handoff performance may be identified. In this illustrative example, a first test frame 208 may be of a "normal" size (e.g., a payload of 100 bytes to 1500 bytes), while a second test frame 208 may be of a "jumbo" size (e.g., a payload of more than 1500 bytes). Both of the first and second test frames 208 may be utilized for handoff performance measurement to measure handoff performance for each frame size (i.e., associate handoff performance data on the level of the size of the test frames 208). Any other parameter (e.g., EVC) may be varied, singularly or in combination with other parameters, among test frames 208 in a similar manner so that handoff performance metrics may be calculated on various levels to determine which parameter values outperform others in terms of handoff between edge devices.

In some embodiments, bandwidth utilization efficiency (or channel efficiency) may be monitored at the time of carrying out handoff performance measurement to determine how bandwidth utilization efficiency influences handoff performance. For example, during a measurement instance where a test frame 208 is sent between edge devices in different network domains, a bandwidth utilization efficiency may be measured as 70% (e.g., 70 megabits/second (Mbit/s) achieved throughput in a 100 Mbit/s Ethernet connection) such that handoff performance data collected during the measurement instance may be associated with the measured bandwidth utilization efficiency of 70% to establish correlations between handoff performance and bandwidth utilization efficiency.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 5:
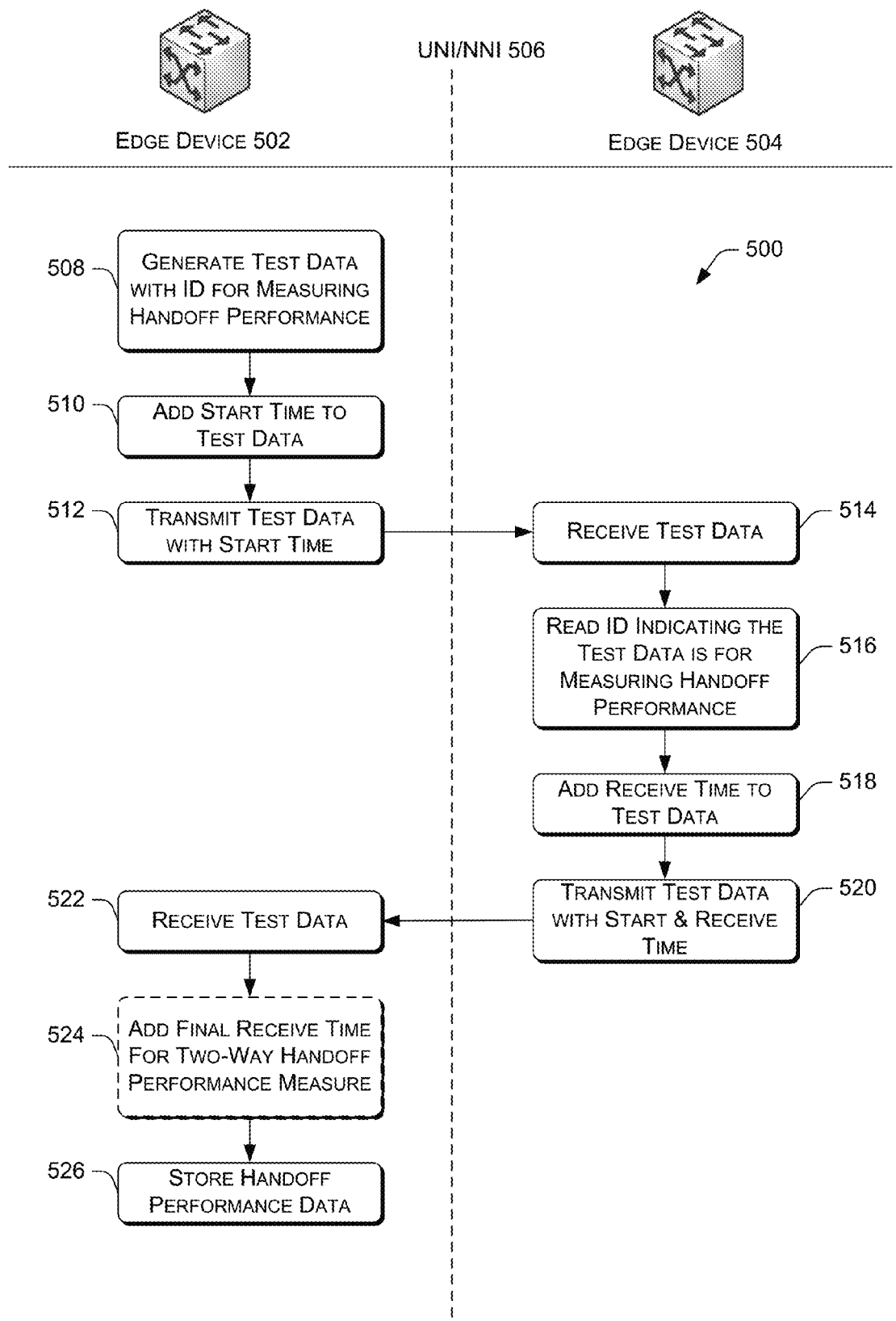
FIG. 5 illustrates a flowchart of an example peer-based handoff performance measurement process.

FIG. 5 illustrates a flowchart of an example peer-based handoff performance measurement process 500. The process 500 may be implemented between two example edge devices 502 and 504 by transmitting test data over a UNI/NNI 506. The edge devices 502 and 504 may be within different network domains demarcated by the UNI/NNI 506.

At 508, the edge device 502 may generate test data having an identifier (ID) to indicate that the test data is to be used for measuring handoff performance over the UNI/NNI 506. In some embodiments, the test data comprises a test frame 208 of a packet-switched network, and the ID is included in the test frame 208. For example, the ID may be included in a DSCP field 220 as a DSCP bit value that indicates to the edge devices 502 and 504 that the test data is for handoff performance measurement.

At 510, a start time may be added to the test data indicating a start of a measurement instance using the test data. This may be enabled by a clock implemented in, or otherwise referenced by, the edge device 502. In some embodiments, the start time may be added to the payload data field 222 of the test data when the test data is in the form of a test frame 208.

At 512, the test data including the ID and the start time may be transmitted to the edge device 504 over the UNI/NNI 506. At 514, the edge device 504 may receive the test data including the ID and the start time.

At 516, the edge device 504 may read the ID (e.g., read the DSCP bit value in the DSCP field 220 of a test frame 208) in the test data to recognize that the test data is for measuring handoff performance over the UNI/NNI 506. Upon recognizing that the test data is for measuring handoff performance, the edge device 504 may add a receive time to the test data at 518. In some embodiments, the receive time may be added to the payload data field 222 of the test data when the test data is in the form of a test frame 208.

At 520, the edge device 504 may transmit the test data to the edge device 502 over the UNI/NNI 506. In this scenario, the test data includes the start time and the receive time that were added to the test data at 510 and 518, respectively.

At 522, the edge device 502 may receive the test data that includes the start time and the receive time. An optional step 524 may be carried out when two-way (i.e., roundtrip) handoff performance is desired where a final receive time is added to the test data by the edge device 502. In some embodiments, the final receive time may be added to the payload data field 222 of the test data when the test data is in the form of a test frame 208.

At 526, the timing information (i.e., start time, receive time, and optional final receive time) may be stored as handoff performance data. It is to be appreciated that the process 500 illustrates a scenario where two edge devices send test data back and forth using a test protocol without the aid of any external devices. However, as described with reference to FIG. 3, a neutral mediator 302 may be utilized with any pair of edge devices and the test data routed therebetween in the manners described with respect to FIG. 3.

In some embodiments, the storing of handoff performance data at 526 may involve periodically reporting handoff performance data to an associated performance server to be stored in a data store associated therewith, such as the data stores 136-142. Additionally, or alternatively, the handoff performance data may be stored locally at the edge device.

Figure 6:
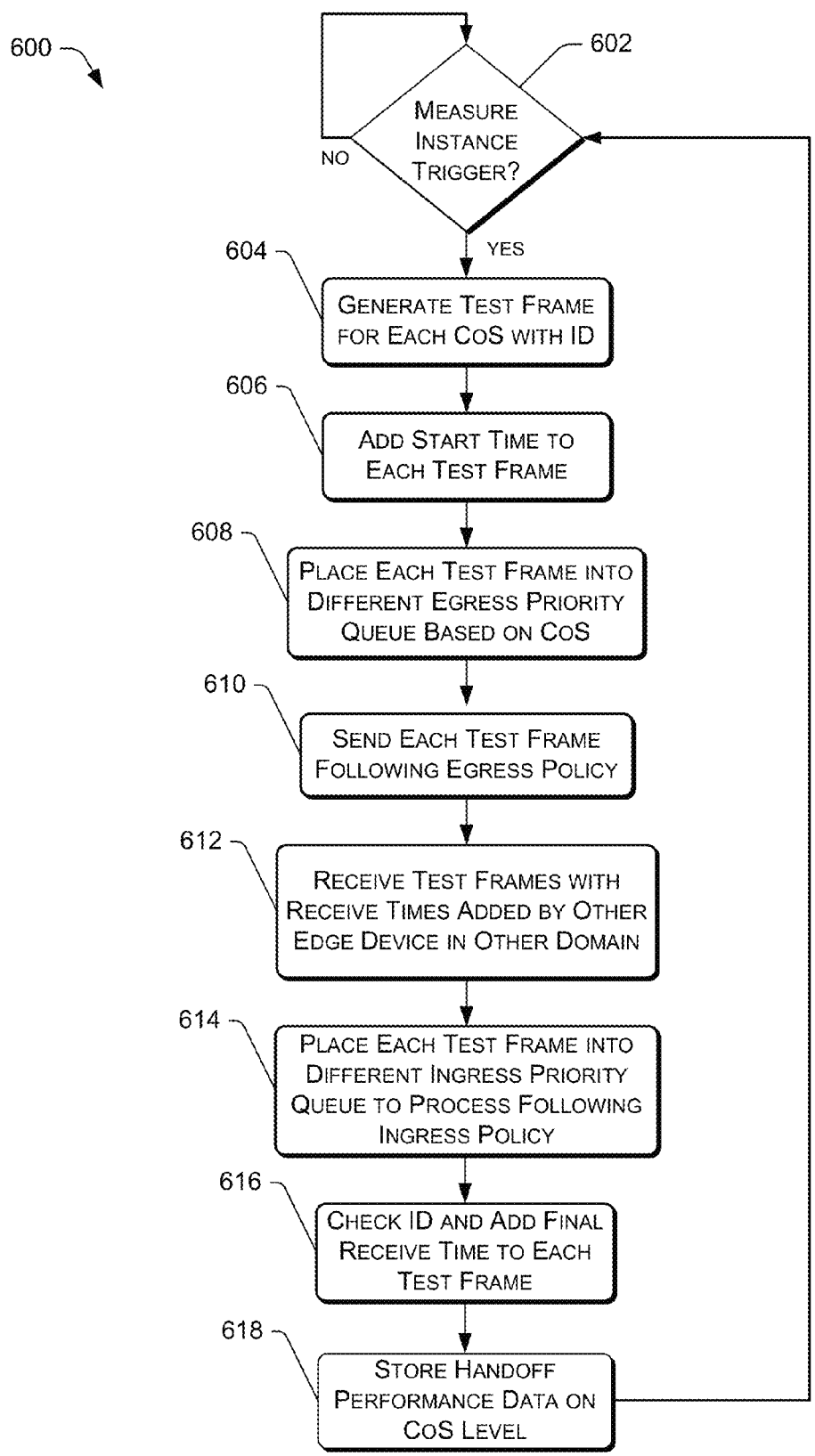
FIG. 6 illustrates a flowchart of an example peer-based handoff performance measurement process according to another embodiment where handoff performance may be measured across multiple CoS levels.

FIG. 6 illustrates a flowchart of an example peer-based handoff performance measurement process 600 according to another embodiment where handoff performance may be measured across multiple CoS levels, as described in detail with respect to FIG. 4. At 602, a determination may be made as to whether a measurement instance should be initiated. As noted above, a measurement instance may occur periodically such that a timer or clock may be monitored to ascertain whether a measurement instance should be triggered at 602. For example, a measurement instance may be triggered for each test frame that is sent by an edge device such that multiple measurement instances may be triggered in sequence over the course of a handoff performance monitoring process, and this handoff performance monitoring process may itself be repeated periodically (e.g., every fifteen minutes. Additionally, or alternatively, measurement instances may be initiated at the direction of a user/operator who is authorized to initiate handoff performance measurements with edge devices.

If a measurement instance is triggered at 602, multiple test frames 208 may be generated at 604 by a device, such as a CE device 110 or a PE device 112 of FIG. 1, each test frame 208 being associated with a CoS and having an ID that indicates the test frame 208 is to be used for measuring handoff performance. As noted previously, the ID of the test frame 208 may take the form of a DSCP bit value in the DSCP field 220 of the test frame 208. The CoS may be specified within the test frame 208 as well, such as in the P-bits field 218 of the test frame 208.

At 606, a start time may be added to each test frame, such as by adding the start time within the payload data field 222. At 608, the test frames 208 may be placed into a respective egress priority queue of the edge device that is to send the test frame 208 based on the specified CoS and the egress priority policy.

At 610, the edge device sends each test frame 208 generated at 604 following the egress priority policy to another edge device in another network domain to establish a handshake and to perform the peer-based handoff performance measurement. At 612, the edge device may receive at least some of the test frames 208 that were sent at 610 (e.g., due to frame loss), the test frames now including receive times that were added to the test frames 208 by other edge device in the other network domain.

At 614, the edge device may place each test frame 208 into different ingress priority queues so that the received test frames 208 are processed according to an ingress priority policy based on the CoS of the test frames 208. At 616, the ID (e.g., the DSCP bit value) of the test frames 208 are read/ checked to recognize the test frames 208 for the purpose of handoff performance measurement, and a final receive time may be added to each recognized test frame 208 for round-trip handoff performance measurement.

At 618, the timing information (i.e., the start time, the receive time, and optionally the final receive time) may be stored as handoff performance data and associated at the CoS level. The process 600 may iterate after determining the trigger for the next measurement instance at 602.

Figure 7:
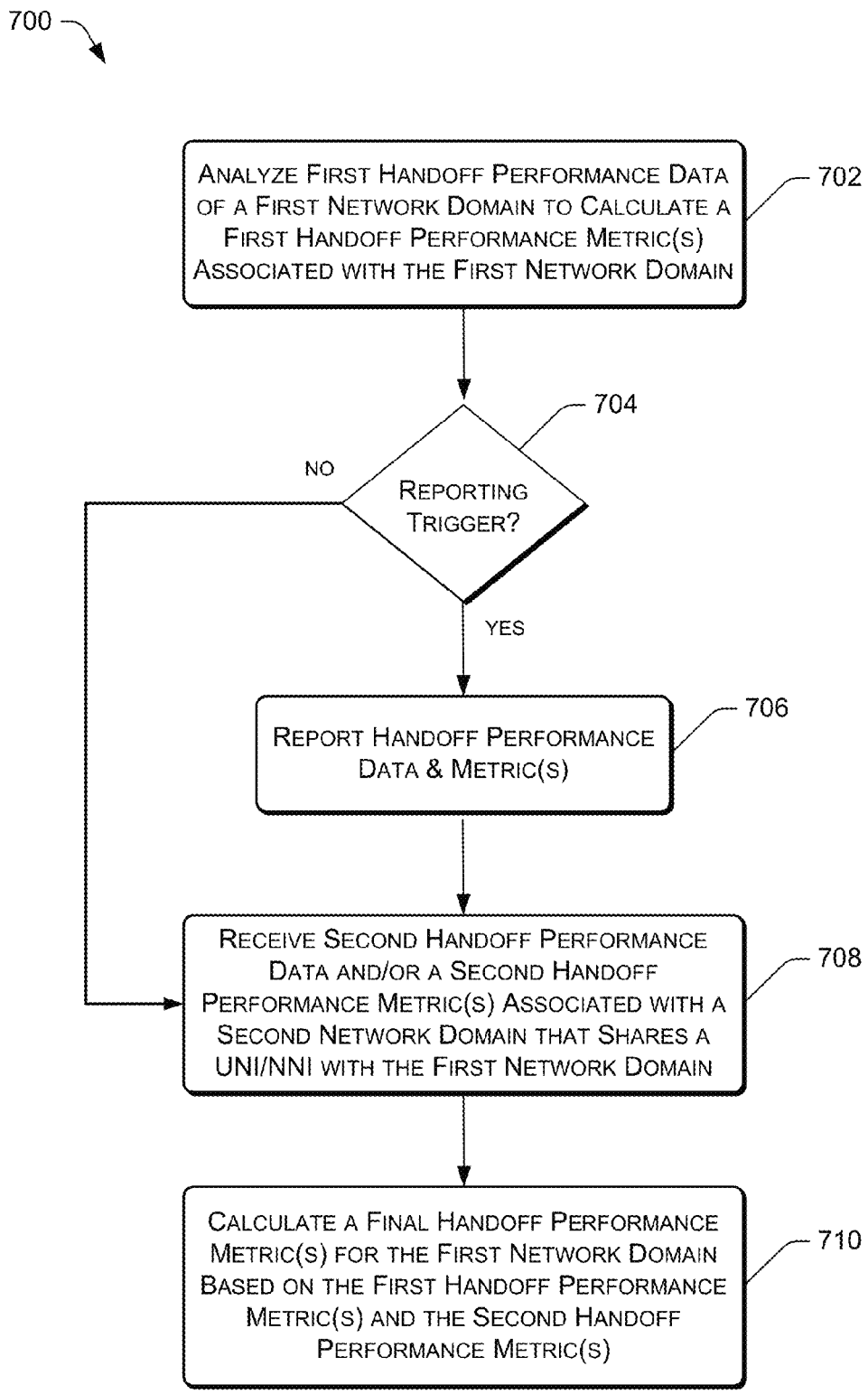
FIG. 7 illustrates a flowchart of an example process of calculating and reporting handoff performance metrics.

FIG. 7 illustrates a flowchart of an example process 700 of calculating and reporting handoff performance metrics. At 702, first handoff performance data, such as the timing information resulting from the processes 500 and/or 600, may be analyzed to calculate one or more first handoff performance metrics associated with a first network domain. For example, the performance server 138 may analyze handoff performance data collected within the provider domain 116, which may represent the first network domain with reference to the process 700, and from this analysis, the performance server 138 may calculate the first handoff performance metric(s). In this example, the first handoff performance metric(s) may include one or more of frame delay, jitter, frame loss ratio, availability, or any suitable metric for either or both of one-way or round trip paths of a test frame 208. This may be accomplished by comparing relative times (e.g., start time, receive time, and/or final receive time) within the handoff performance data. Moreover, because the test data may be transported in a multi-CoS service environment, the calculations at 702 may be made on any suitable level, including the granularity of the CoS level, or aggregated to the EVC level, operator virtual connection (OVC) level, and/or even a market level.

At 704, a determination is made as to whether the handoff performance metric(s) should be reported. For example, a service provider that maintains and operates the carrier network 108(1) in the provider domain 116 may be obligated to report handoff performance metrics to a customer/subscriber, or to another service provider of another network domain, pursuant to an SLA between the parties. In this manner, different entities of different network domains may exchange handoff performance metrics between each other within the mobile backhaul network. Additionally, or alternatively, the service provider may report the handoff performance metric (s) to a remote reporting server where it can be aggregated with other handoff performance metrics collected by other entities associated with other network domains and reported to the remote reporting server so that overall EVC performance statistics may be generated at the remote reporting server.

Wherever the metric(s) are to be reported to, if it is determined that a reporting trigger has occurred, handoff performance metrics, and in some instances, the underlying data (e.g., timing information), are reported at 706 to the appropriate entity/device. A reporting trigger at 704 may be a time-based trigger, a user-directed trigger, or any suitable trigger.

If no reporting trigger occurs at 704, the process 700 may proceed to 708 where a performance server of the first domain (e.g., the performance server 130 of the provider domain 116) receives second handoff performance data and/or second handoff performance metric(s) associated with a second network domain that shares a UNI/NNI with the first network domain. Continuing with the same example, the handoff performance data and/or metric(s) received at 708 may be associated with the customer domain (e.g., customer network domain portion 114A or customer network domain portion 114B), which shares the UNI 122(1) with the provider domain 116. In this illustrative example, the performance server 136 of the customer network domain 114A or 114B may report or otherwise send its own collected handoff performance data and/or calculated handoff performance metric(s) to the performance server 138 of the provider domain 116 where it is received at 708. In order to process the received handoff performance data and/or metric(s), the sending and receiving entities/devices may use an agreed-upon schema or format for reporting such data.

At 710, a final handoff performance metric(s) may be calculated for the first network domain (e.g., the provider domain 116) based at least in part on the first handoff performance metric(s) calculated at 702 and the second handoff performance metric(s) received at 708. In some embodiments, the final handoff performance metric(s) is an average of the two (i.e., first and second) handoff performance metrics in the respective domains that share the UNI/NNI. Averaging handoff performance from the perspectives of two edge devices on either side of a UNI/NNI may allow for reconciliation of any discrepancies between the measurements taken from each perspective. To illustrate this averaging technique that may be used for any suitable handoff performance metric, and continuing with the aforementioned example, the following equations (8) may be utilized for calculating a final frame delay for the provider domain 116 at the handoff across the UNI 122(1) of FIG. 1:

$$\text{Final Delay } (A \rightarrow B) = \frac{(\text{Start } Time_A - Rec.Time_B) + (Rec.Time_A - \text{Final } Rec.Time_B)}{2} \quad \text{Equ. (8)}$$

Other handoff performance metrics (e.g., jitter, frame loss ratio, etc.) may be calculated by averaging metrics taken across a UNI/NNI in a similar fashion to that shown for the frame delay calculation of equation (8). In other embodiments, other statistical calculations may be performed at 710 including determination of median handoff performance metrics over a selected time interval, or any other suitable measurement. In this manner, any discrepancies between the respective handoff performance metrics may be taken into account.

It is to be appreciated that the first and second handoff performance metric(s) may be exchanged between different domains, and/or reported to a neutral third party device (e.g., the neutral mediator 302 of FIG. 3, or any other remote reporting server) to perform the calculation of the final handoff performance metric(s) at 710 at the neutral device. In any case, by reporting/exchanging handoff performance metrics periodically, handoff performance metrics may be better verified for enforcing agreements, such as the SLA, between a customer and service provider of a mobile backhaul network.

In some embodiments, further processing and downstream decisions may occur in response to the calculated handoff performance, such as routing decisions when multiple available EVCs are available for network traffic within a network (e.g., the mobile backhaul network). For example, handoff performance may be measured at various UNI/NNIs for different EVCs within the mobile backhaul network 100 to determine which EVC may be an optimal EVC so that network traffic may be rerouted to optimize communication rates and delivery of network traffic generally. In some embodiments, historical data may be accessed to identify trends in network delivery performance revealed from the handoff performance data that has been recorded. In this manner, routing of network traffic may predict certain days and/or times that certain EVC pipes are expected to have the best network traffic performance. The system may dynamically adapt network traffic routing based on these determinations.

Example Systems

Figure 8:
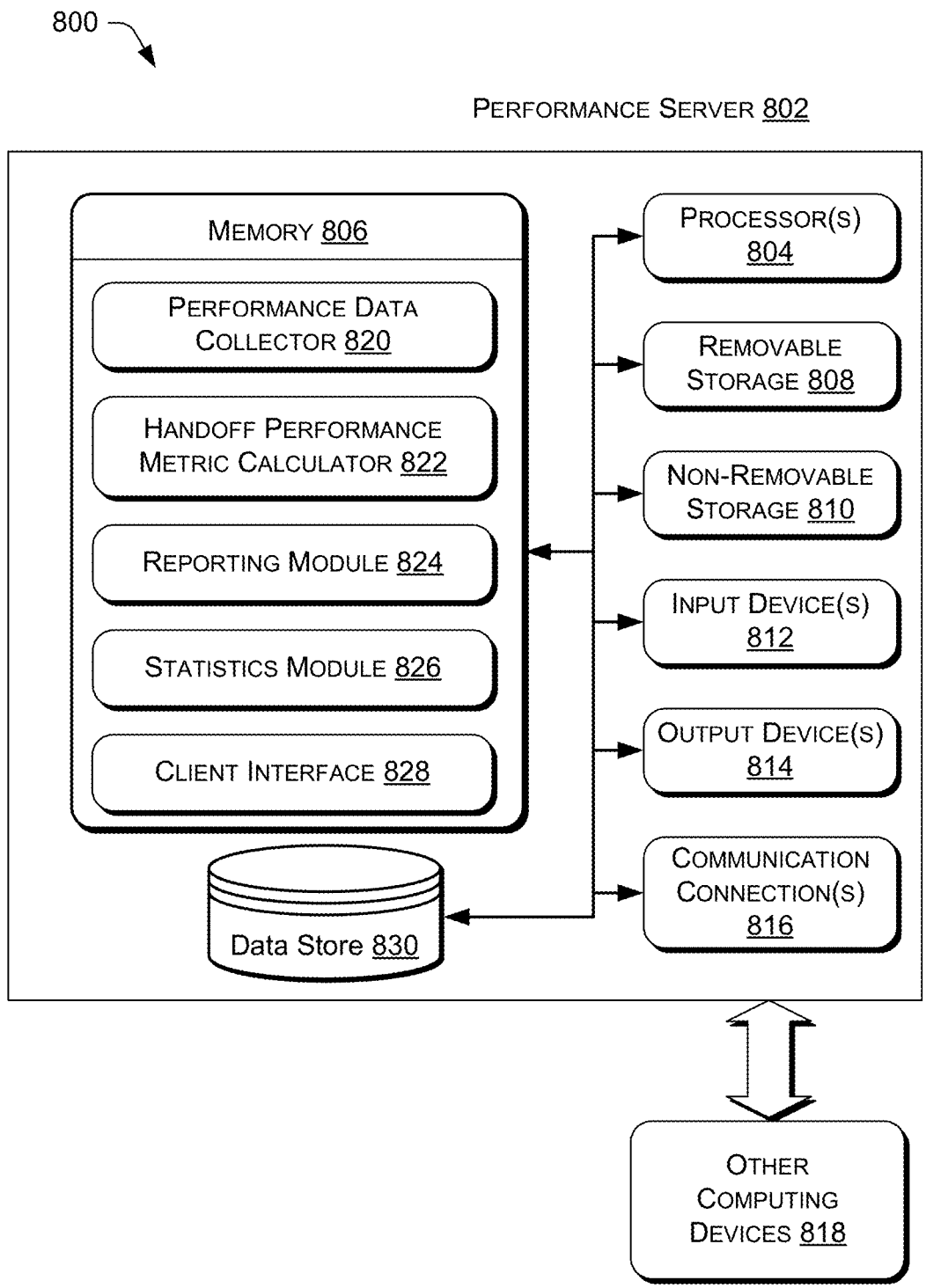
FIG. 8 illustrates an example performance server architecture in accordance with various embodiments.

FIG. 8 illustrates an example performance server architecture 800 in accordance with various embodiments. The architecture 800 includes a performance server 802, which may represent any one of the performance servers 128-134 of FIG. 1. As shown, the performance server 802 may include one or more processors 804 and one or more forms of computer-readable memory 806. The performance server 802 may also include additional storage devices. Such additional storage may include removable storage 808 and/or non-removable storage 810.

The performance server 802 may further include input devices 812, including, without limitation, physical buttons (e.g., keyboard or keypad), a microphone, pointing devices (e.g., mouse, pen, stylus, etc.), or any other suitable input devices 812 coupled communicatively to the processor(s) 804 and the computer-readable memory 806. The performance server 802 may further include output devices 814, including, without limitation, a display, speakers, or any other suitable output device coupled communicatively to the processor(s) 804 and the computer-readable memory 806.

The performance server 802 may further include communications connection(s) 816 that allow the performance server 802 to communicate with other computing devices 818 such as via a network. The other computing devices 818 may include other performance servers (e.g., individual ones of the performance servers 128-134 of FIG. 1 that are in a different network domain of the mobile backhaul network 100), and/or a remote reporting server that collects EVC performance data from the performance server 802, among other computing devices 818. Accordingly, the communications connection(s) 816 may facilitate communication over any suitable network(s), including, without limitation, such as cable networks, the Internet, local area networks, mobile telephone networks, wide area networks and wireless networks, the mobile backhaul network 100, or a combination of such networks. In this manner, the performance server 802 may report collected handoff performance data and metrics to the other computing devices 818.

In various embodiments, the computer-readable memory 806 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 806 may also be described as computer storage media and may include volatile and nonvolatile, removable and non-removable media implemented in any method or technology for storage of information, such as computer readable instructions, data structures, program modules, or other data. Computer-readable memory 806, removable storage 808 and non-removable storage 810 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the performance server 802. Any such computer-readable storage media may be part of the performance server 802.

In some embodiments, the computer-readable memory 806 may include a performance data collector 820 to periodically collect EVC performance data, including the handoff performance data disclosed herein. In this manner, any given network domain (e.g., the customer domain 114A and/or 114B, the provider domain 116, and/or the provider domain 118) may periodically collect handoff performance data (perhaps with other EVC performance data) using the peer-based handoff performance measurement scheme with any of the edge devices in the network domain that are designated as MEPs for handoff performance measurement.

The computer-readable memory 806 may further include a handoff performance metric calculator 822 to calculate various handoff performance metrics disclosed herein, such as frame delay, jitter, frame loss ratio, availability, and so on. The handoff performance metric calculator 822 may calculate handoff performance metrics local to the network domain with which it is associated, and may additionally calculate handoff performance metrics in a manner similar to the process 700 of FIG. 7 with the aid of a reporting module 824 that is configured to exchange or otherwise receive reported handoff performance data and/or metrics from other performance servers (other computing devices 818) in other network domains over the communication connection(s) 816.

The reporting module 824 may be further configured to report, among other things, handoff performance data and metrics to any other computing device(s) 818 via the communication connection(s) 816. For example, the performance server 802 may report, using the reporting module 824, handoff performance metrics calculated within its associated network domain to another performance server(s) (e.g., individual ones of the performance servers 128-134 of FIG. 1) in a business-to-business (B2B) implementation. Additionally, or alternatively, the reporting module 824 may enable reporting of handoff performance data and/or metrics to a remote reporting server that collects EVC performance data across a plurality of network domains, such as multiple network domains of a mobile backhaul network (e.g., the mobile backhaul network 100).

For even more comprehensive EVC performance measurement, the computer-readable memory 806 may include a statistics module 826 to aggregate information from one or more network domains that an EVC is implemented across and to compile statistics based on the data. In this manner, handoff performance may be aggregated and analyzed across multiple network domains, such as multiple network domains of a mobile backhaul network, to provide end-to-end EVC performance analysis, as well as to reconcile metrics calculated in each domain. This end-to-end EVC performance analysis may allow for verified SLA enforcement between parties to the SLA. For example, by comparing handoff performance data and/or metrics collected and determined from different network domains of a mobile backhaul network (e.g., the mobile backhaul network 100 of FIG. 1), the statistics module 826 may determine responsible parties (e.g., service provider or customer to carrier network for mobile backhaul) for breach of the SLA so that performance degradation, impairments, or faults may be corrected and addressed using verified results determined by the statistics module 826. The functions enabled by the statistics module 826 may be performed on any suitable device, such as a remote device with respect to the mobile backhaul network 100 that collects handoff performance metrics across multiple network domains.

The computer-readable memory 806 may further include a client interface 828 that may provide a portal to access handoff performance data, metrics, and/or statistics by an authorized client device (i.e., other computing device 818). In this manner, authorized users and/or applications may use a client device to access the performance server 802 over the communication(s) connection 816 to view, obtain (e.g., query and download or export information), or otherwise consume information made available by the performance server 802 via the client interface 828. In some embodiments, a user or application may submit a query to via the client interface 828 requesting information from the performance server 802. For example, a customer of the mobile backhaul network 100 may access the performance server 802 of a service provider (e.g., the performance server 130 or 132 of FIG. 1) via the client interface 828 to authenticate with the performance server 802 (e.g., submit credentials), and to query the performance server 802 for desired information, such as handoff performance metrics at a particular CoS level, or at an EVC level, and or any suitable level. Other information and data in addition to handoff performance may be accessed via the client interface 828.

The performance server 802 may further have access to, or otherwise include, a data store 830 to store various information and data, such as the handoff performance data collected by the performance data collector 820, the handoff performance metrics calculated by the handoff performance metric calculator 822, reporting schema for use by the reporting module 824 in communicating reported data and metrics on handoff performance to the other computing devices 818, statistics generated by the statistics module 826, and so on.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
generating, by a first edge device in a first network domain of a mobile backhaul network, a test frame having:
a test frame identifier (ID) to indicate that the test frame is for measuring handoff performance over an interface between the first edge device and a second edge device in a second network domain of the mobile backhaul network, and a class of service (CoS) ID to indicate a CoS level of the test frame;

adding, by the first edge device, a start time to the test frame indicating a start of a measurement instance using the test frame;

sending, by the first edge device, the test frame to the second edge device over the interface;

receiving, by the first edge device, the test frame from the second edge device over the interface, the test frame including an intermediate receive time that was added to the test frame indicating a time at which the test frame was received by the second edge device;

in response to the receiving the test frame from the second edge device, adding, by the first edge device, a final receive time to the test frame indicating an end of the measurement instance; and storing the start time, the intermediate receive time, and the final receive time as handoff performance data in association with the CoS level.

2. The method of claim 1, wherein the test frame ID comprises a differentiated services code point (DSCP) value.

3. The method of claim 1, wherein the start time, the intermediate receive time, and the final receive time are added to a payload data field of the test frame.

4. The method of claim 1, wherein the generating the test frame comprises generating a plurality of test frames, individual ones of the plurality of test frames being associated with a different class of service (CoS) indicative of processing priority of the individual ones of the plurality of test frames at the first edge device and the second edge device, the method further comprising associating the handoff performance data for each of the plurality of test frames with a respective CoS.

5. The method of claim 4, further comprising:
adding the start time to each of the individual ones of the plurality of test frames;

placing the individual ones of the plurality of test frames into respective egress priority queues based on a respective CoS of each test frame;

sending, based on an egress priority policy for the egress priority queues, the individual ones of the plurality of test frames through an egress port of the first edge device to the second edge device over the interface; and in response to receiving the individual ones of the plurality of test frames from the second edge device over the interface, placing the individual ones of the plurality of test frames into an ingress priority queue based on the respective CoS of each test frame, each test frame having a respective intermediate receive time, wherein the handoff performance data further includes the intermediate receive times associated with each of the plurality of test frames.

6. The method of claim 1, wherein the interface comprises one of a user-to-network interface (UNI) or a network-to-network interface (NNI).

7. One or more non-transitory computer-readable media storing computer-executable instructions that, when executed, cause a first edge device of a first network domain to perform acts comprising:

generating test data to be transmitted from the first edge device of the first network domain over an interface to a second edge device of a second network domain, the test data having an identifier (ID) to indicate that the test data is to be used for measuring handoff performance over the interface;

adding a start time to the test data indicating a start of a measurement instance using the test data;

transmitting the test data to the second edge device over the interface;

receiving the test data from the second edge device, the test data having a receive time that was added to the test data indicating a time at which the test data was received by the second edge device; and storing the start time and the receive time as handoff performance data associated with the measurement instance.

8. The one or more non-transitory computer-readable media of claim 7, the acts further comprising adding a final receive time to the test data indicating an end of the measurement instance, the final receive time representing a time at which the test data was received by the first edge device, and wherein the handoff performance data includes the final receive time.

9. The one or more non-transitory computer-readable media of claim 7, wherein the test data comprises a test frame, and wherein the ID comprises a differentiated services code point (DSCP) value.

10. The one or more non-transitory computer-readable media of claim 7, wherein the measurement instance is one of a plurality of measurement instances that periodically occur at a predefined time interval.

11. The one or more non-transitory computer-readable media of claim 10, wherein a predefined number of the plurality of measurement instances occur over a measurement period.

12. The one or more non-transitory computer-readable media of claim 7, wherein the generating the test data comprises generating a plurality of test frames, each test frame being associated with a different class of service (CoS) indicative of processing priority of the plurality of test frames at the first edge device and the second edge device.

13. The one or more non-transitory computer-readable media of claim 12, wherein the different CoS is identified in each test frame by a p-bit value.

14. The one or more non-transitory computer-readable media of claim 8, the acts further comprising calculating a frame delay over the interface as at least one of:
a one-way frame delay measured as a difference between the start time and the receive time or a difference between the receive time and the final receive time; or
a two-way frame delay measured by a difference between the start time and the final receive time.

15. The one or more non-transitory computer-readable media of claim 10, wherein the test data comprises a test frame, the acts further comprising calculating handoff performance metrics using the plurality of measurement instances for a plurality of test frames, and wherein at least some of the plurality of test frames are returned from the second edge device over the interface, the handoff performance metrics including at least one of:
a jitter calculation based on a difference between consecutive frame delays for any two consecutive test frames of the at least some of the plurality of test frames, or
a frame loss rate based on a count of the at least some of the plurality of test frames that were returned from the second edge device divided by a total number of the plurality of test frames that were sent to the second edge device.

16. The one or more non-transitory computer-readable media of claim 7, the acts further comprising:
calculating a first handoff performance metric associated with the first edge device based at least in part on the handoff performance data;

receiving a second handoff performance metric associated with the second edge device; and determining a representative handoff performance metric based at least in part on the first handoff performance metric and the second handoff performance metric.

17. A first edge device of first network domain, the first edge device comprising:

one or more processors;

one or more memories storing instructions that, when executed by the one or more processors, perform acts comprising:

receiving a test frame at a particular time;

reading a test frame identifier (ID) in the test frame, the test frame ID indicating that the test frame is for measuring handoff performance over an interface between the first edge device and a second edge device of a second network domain;

in response to reading the test frame ID, adding the particular time to the test frame; and sending the test frame having the particular time to a destination device based at least in part on address information in the test frame.

18. The first edge device of claim 17, wherein the address information is associated with at least one of the second edge device or a mediator device configured to calculate a handoff performance metric between the first edge device and the second edge device based at least in part on the particular time.

19. The first edge device of claim 17, wherein the test frame ID comprises a differentiated services code point (DSCP) value.

20. The first edge device of claim 17, wherein the receiving the test frame comprises receiving a plurality of test frames at different times caused by a different class of service (CoS) associated with each of the plurality of test frames, the acts further comprising adding respective ones of the different times to each of the plurality of test frames.

* * * * *